Jan. 28, 1958
J. L. RUSSELL
2,821,702
APPARATUS FOR COMPARING SUCCESSIVELY
OCCURRING ELECTRICAL PULSES
Filed May 23, 1955
2 Sheets-Sheet 1
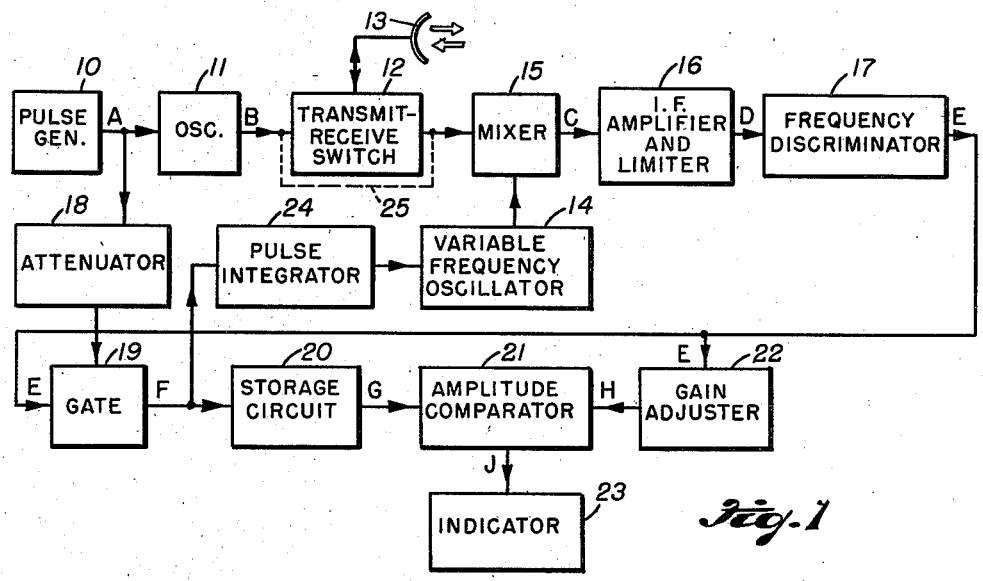
*Fig. 1*
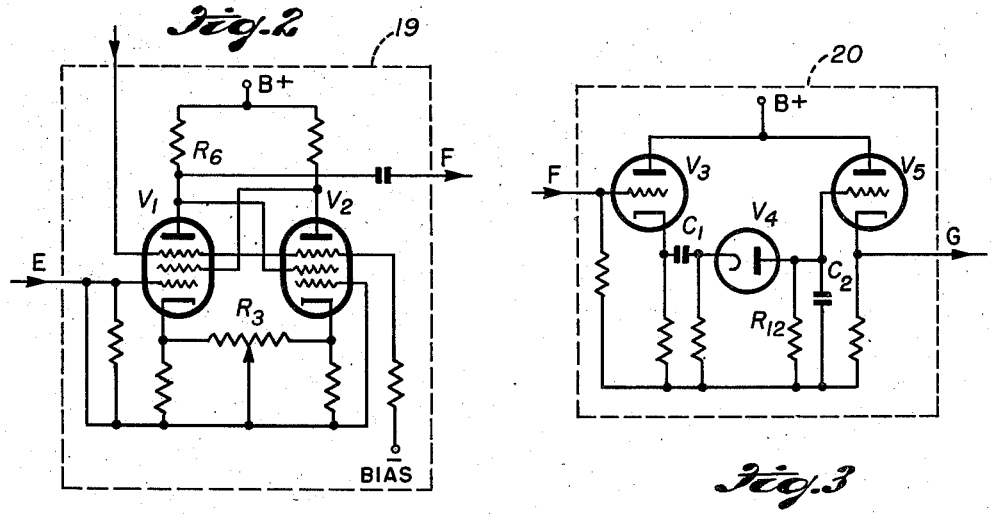
*Fig. 2*
*Fig. 3*
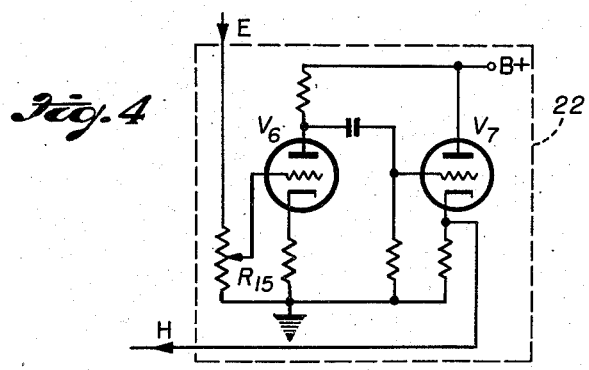
*Fig. 4*
INVENTOR.
J. L. RUSSELL
BY
*Ell Woodbury*
ATTORNEY

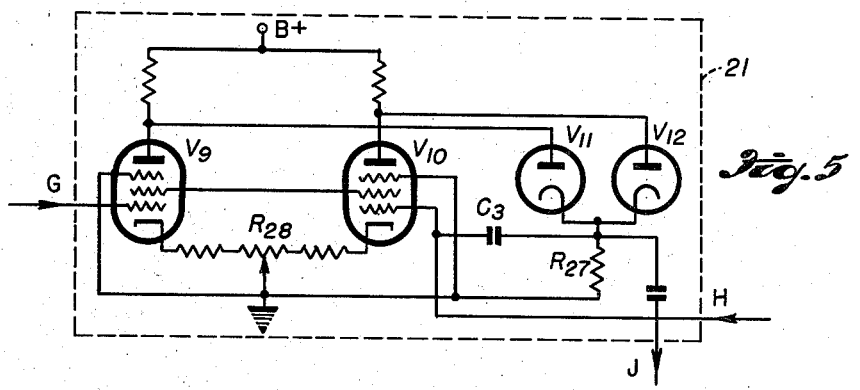
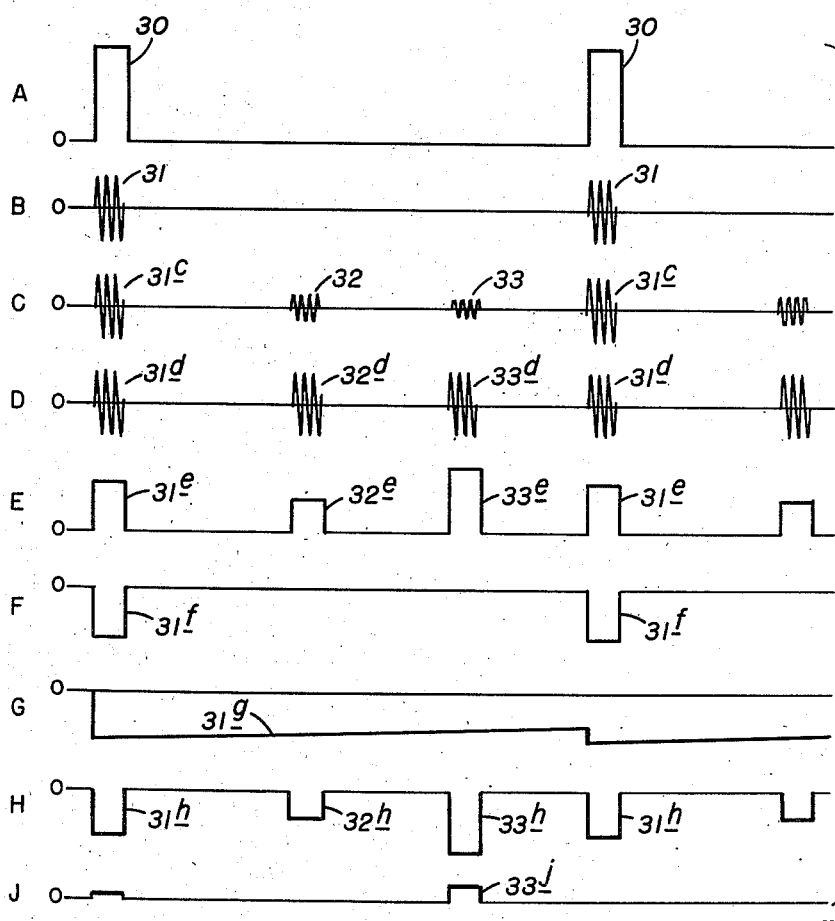

United States Patent Office 2,821,702
Patented Jan. 28, 1958

2,821,702

APPARATUS FOR COMPARING SUCCESSIVELY OCCURRING ELECTRICAL PULSES

James L. Russell, Sun Valley, Calif., assignor to Bendix Aviation Corporation, North Hollywood, Calif., a corporation of Delaware Application May 23, 1955, Serial No. 510,142

9 Claims. (Cl. 343—7.7)

This invention relates to the problem of determining or measuring differences in the characteristics of two electrical pulses of brief duration that occur successively; i. e., are not coincident. It is useful in, although not limited to, echo type object-detecting systems that indicate whether a detected object is approaching or receding from the point of observation, from the direction and magnitude of Doppler frequency shifts in the echo waves. Although applicable to systems using sonic or ultrasonic waves in air or water, it is particularly useful in radar systems employing high frequency electromagnetic waves.

An object of the invention is to provide a simple and effective apparatus for comparing and determining a difference between two successively occurring electrical pulses.

Another object is to provide a simple and effective system for measuring frequency differences between two pulses or trains of waves that are time displaced from each other; i. e., not coexistent.

Another object of the invention is to provide a simple, practicable and effective motion-responsive echo type object-detecting system.

A feature of the invention is a simple and effective method of compensating for frequency drift of the transmitter in a pulse type object-detecting system.

Other more specific objects and features of the invention will appear from the description to follow.

It is well known that if, in an echo ranging system, transmitted waves are reflected from an object that has relative motion toward or away from the transmitter, the frequency of the reflected waves will be higher or lower than that of the transmitted waves because of the Doppler effect. By comparing the transmitted and reflected waves, the frequency shift can be measured and used to determine the direction and velocity of movement of the object. The usual method of comparing the waves has been to heterodyne them, thereby directly producing a wave of the difference frequency, and measuring its frequency. This method is not well adapted for use with pulse echo systems, because the transmitted and reflected pulses are not coexistent but are spaced apart a time equal to the transit time to the object and back. Hence, a continuously running, transmitting oscillator or a separate continuously running oscillator that is frequency locked to the transmitting oscillator must be provided. Although the problem of providing a heterodyning wave of the transmitting frequency and coexistent with the reflected pulse can be solved, there is still an objection to the heterodyning method in a pulse system. It is that if the pulse duration is small compared with the period of the difference frequency to be determined, many pulses must be received to determine the value of the difference frequency, and if the transmitted beam has a rapid scanning motion a target may be scanned by too few pulses to obtain a frequency comparison.

The foregoing difficulties encountered with prior practices are eliminated in accordance with the present invention, which provides a frequency comparison between each transmitted pulse and the resultant echo pulse or pulses. Briefly, the new method is to derive from the transmitted and reflected pulses first and second D. C. pulses of amplitude proportional to the frequencies of their parent pulses, and compare the D. C. pulses. The D. C. pulses are not coexistent, but are spaced apart the same as the transmitted and reflected pulses from which they were derived. An essential concept of the present invention is the storage of the first D. C. pulse derived from the transmitted pulse until the second D. C. pulse derived from the reflected wave occurs.

In the practice of the invention, it is necessary to separate the first D. C. pulse resulting from the transmitted waves from the D. C. pulse or pulses resulting from echoes in order to apply only the first D. C. pulse to the storage means, and this is accomplished by a gate synchronized with the transmitted pulse. A separate frequency-regulating potential can be derived from the separated first pulses and utilized to reduce the effects of frequency wander of the transmitter by applying it to an automatic frequency control circuit associated with the transmitter, or with the local oscillator of a superheterodyne amplifier ahead of the frequency discriminator that derives the D. C. pulses from the transmitted and reflected pulses.

A full understanding of the invention may be had from the following detailed description with reference to the drawing, in which:

Fig. 1 is a block diagram of a radar system incorporating the invention.

Fig. 2 is a schematic diagram of a gate circuit that may be employed in the system of Fig. 1.

Fig. 3 is a schematic diagram of a storage circuit that may be employed in the system of Fig. 1.

Fig. 4 is a schematic diagram of a gain adjuster circuit that may be employed in the system of Fig. 1.

Fig. 5 is a schematic diagram of an ampitude comparator circuit that may be employed in the system of Fig. 1.

Fig. 6 is a series of graphs illustrating the operation of the system.

Referring to Fig. 1, the radar system therein disclosed comprises the usual pulse generator 10 for periodically energizing an oscillator 11, the output of which is applied through the usual transmit-receive switch 12 to an antenna 13. Except during transmission, the switch 12 connects the antenna to the receiving portion of the system which comprises a local oscillator 14, a mixer 15, a limiter 16, a frequency discriminator 17, a pulse attenuator 18, a gate 19, a storage circuit 20, an amplitude comparator 21, a gain adjuster 22, and an indicator 23.

The operation of the system will be described with reference to the graphs A to J of Fig. 6, which indicate the potentials existent at correspondingly lettered points in Fig. 1.

The pulse generator 10 periodically applies powerful square D. C. pulses 30 (curve A) to the oscillator 11, energizing it to generate trains of pulses 31 of A. C. of corresponding duration, as shown in curve B, which energize the antenna 13 to transmit radio energy. Between the pulses 31, the antenna 13 is connected by the switch 12 to the mixer 15 to apply to it A. C. pulses resulting from radio energy reflected from an object or objects back to the antenna. Although the oscillator 11 is disconnecteed from the mixer during transmission, some leakage occurs, as indicated by the dotted connection 25 in Fig. 1, so that the mixer is sequentially energized by the transmitted pulse and by echo pulses. These pulses are mixed with the output of the local oscillator 14 to produce a sequence of pulses of intermediate frequency, an example of which is shown in graph C. This graph shows a pulse 31c coincident with the transmitted pulse 31, an echo pulse 32 from a relatively close object, and an echo pulse 33 from a more distance object.

The pulses 32 and 33 are much weaker than pulse 31c, but all are brought to equal magnitude by the limiter 16, as shown by pulses 31d, 32d and 33d in graph D.

If there is no relative motion of the echo-producing object toward or away from the antenna 13, the echo pulses will have the same frequency as the transmitted pulse, and pulses 31d, 32d and 33d in graph D will be of the same frequency. However, if the object is moving away from the antenna, its echo will be of lower frequency, and if it is moving toward the antenna, its echo will be of higher frequency. The system of Fig. 1 measures the frequency difference, if any, between the transmitted pulse 31d and an echo pulse 32d or 33d of higher frequency to indicate the speed of approach of an object moving toward the antenna 13.

It is assumed that the object producing pulse 32d is moving away from the antenna 13, so that its frequency is lower than the transmitted frequency. On the other hand, it is assumed that the object producing pulse 33d is moving toward the antenna 13 so that its frequency is higher than the transmitted frequency.

The output of the limiter 16 is passed through the frequency discriminator 17 which responds to the frequency of the pulses applied thereto to produce D. C. pulses of amplitude proportional to the frequency. Hence, the output of the frequency discriminator at point E is as shown in graph E of Fig. 6. In this graph, the D. C. pulse 31e is of amplitude determined only by the frequency of the transmitted waves, which is the normal frequency to which the echo frequencies are compared. The pulse 32e, being produced by the pulse 32d of lesser frequency than the pulse 31d, is of lesser amplitude than pulse 31e. On the other hand, the pulse 33e, being produced by the pulse 33d of higher frequency than pulse 31d, has greater amplitude than the pulse 31e.

It will be apparent that by comparing the amplitude of the pulse 33e with the amplitude of pulse 31e the difference in the frequencies of the transmitted and reflected pulses can be determined. However, such comparison is complicated by the fact that the pulses 31e and 33e are of very short duration and occur at different times.

In accordance with the present invention, the pulse 31e is stored to produce a continuing potential that diminishes only to an inconsequential extent during the time lapse between pulses 31e and 33e. To accomplish this, the output of the frequency discriminator 17 is first passed through a gate 19 which is synchronized to open at the time of the occurrence of the pulse 31e but closed at all other times, so that it does not pass the pulses 32e and 33e. The controlling pulse for the gate 19 is derived from the pulse generator 10. Since the latter produces a very high potential for the energization of the oscillator 11, a portion of the output is first passed through the attenuator 18 to greatly reduce its magnitude, and then applied to the gate 19. The gate produces a phase reversal so that its output at point F consists of periodic pulses in negative direction 31f, as shown in graph F. These pulses 31f, when applied to the storage circuit 20, produce a saw-tooth wave 31g which is brought to a predetermined negative magnitude at the time of occurrence of each pulse 31f and then very gradually decreases, but is restored to full value again by the next succeeding pulse 31f. The attenuation of the wave 31g is exaggerated in Fig. 6 to make it more apparent.

The wave 31g is applied to the amplitude comparator along with the gain-adjusted, phase-inverted pulses 31h, 32h, 33h, derived from the pulses 31e, 32e and 33e in graph E. The comparator 21 responds to the potential 31g and the pulses 31h, 32h and 33h to produce in its output at point J pulses proportional to any of the pulses 31h, 32h or 33h that are of greater magnitude than the potential 31g. To produce a direct indication of the difference in frequency between the frequency of the transmitted pulse 31d and a reflected pulse of greater frequency, the gain adjuster 22 is so set that the pulse 31h is substantially equal in magnitude to the potential 31g, so that the pulse 33h gets through the comparator to the extent that it exceeds the pulse 31h. This condition is shown in graph J of Fig. 6. It will be noted that an adjustment has been shown in which the potential 31g is very slightly less than the potential of the pulse 31h, so that a slight indication of pulse 31h is produced. The pulse 32h does not get through at all. The pulse 33h gets through substantially to the extent that its magnitude exceeds that of the pulse 31h.

The output of the amplitude comparator may be applied to any known form of indicator 23 for producing a visual or audible indication of the existence and magnitude of the pulse 33j. The pulses can be integrated and applied to any known form of meter, or they can be applied to a cathode ray indicator of known type.

The system described produces an indication only of objects that are approaching the station, because the frequency discriminator 17 is of a type that produces D. C. output pulses of amplitude directly proportional to the frequency of the pulses. By substituting a frequency discriminator that works in a reverse fashion (that is, produces output pulses of amplitude inversely proportional to the input frequency), the pulse 32h in Fig. 6 would be of greater magnitude than the pulse 31h, and the pulse 33h would be of lesser magnitude than pulse 31h. Under these conditions, the system would measure the amplitude of pulses 32h resulting from objects moving away from the station.

It is highly desirable that the frequency of the transmitted pulses 31 in graph B of Fig. 6 remain constant, so that the D. C. pulses 31e will be of constant magnitude. However, the oscillator 11 in a radar system is usually of a type that is difficult to control and maintain at constant frequency. The present invention incorporates a feature for maintaining the frequency of the pulses 31c at the output of the mixer 15 constant regardless of variations in the frequency of the oscillator 11. This is done by varying the frequency of the local oscillator 14 in response to any variations in the amplitude of the pulses 31f at the output of the gate 19. To this end, a portion of the output of the gate 19 is directed to a pulse integrator 24 which integrates it into a uniform or slowly varying D. C. potential proportional to the amplitude of the pulses 31f. The output potential of pulse integrator 24 is then applied to the variable frequency oscillator 14 to vary its frequency in direct relation to the amplitude of the potential delivered to it by the pulse integrator. The result is that an increase in the frequency of the oscillator 11 increases the amplitude of the pulses 31f delivered to the pulse integrator 24, which increases the frequency of the local oscillator 14 to thereby reduce the difference between the local oscillator frequency and the frequency of the transmitting oscillator 11 and restore the frequency of the wave 31c at the output of the mixer 15 very nearly to its normal value. Correcting frequency changes of the local oscillator 14, of course, also affects the frequencies of the echo pulses, thereby maintaining the same frequency relation between the pulses 31c and the echo pulses 32 and 33.

Since pulse generators, oscillators, transmit-receive switches, mixers, limiters, frequency discriminators, attenuators, pulse integrators, variable-frequency oscillators, and indicators, corresponding to the elements 10, 11, 12, 15, 16, 17, 18, 24, 14 and 23 of Fig. 1, are well known, it is unnecessary to disclose specific circuits that are suitable. However, although gates, storage circuits, amplitude comparators, and gain adjusters are known, it is believed desirable to show herein in schematic form some specific circuits of such devices that are suitable for use in the general system of this invention.

Referring to Fig. 2, there is shown a gate circuit that may be employed in the block 19 of the system of Fig. 1. This circuit includes two pentodes $V_1$ and $V_2$, which may be of the type of which the 6AS6 is an example. They are so designed that for a given bias on the first grid and a given potential on the second grid the cathode current is substantially constant with changes in voltage on the third grid, and the latter element serves merely to control the division of the electron stream between the second grid and the anode. Normally, the third grids (the suppressor grids) are so biased that the electron stream flows entirely to the second grid and does not reach the anode. The gating pulse is applied to the suppressor grid and raises its potential sufficiently to permit the major part of the electron stream to flow to the anode rather than to the second (screen) grid. Fluctuation in the potential of the first grid caused by the pulses $31e$ (Fig. 6), which modulates the cathode current, thereby causes fluctuations in the current flow through the resistor $R_6$ and produces the output signals $31f$.

If only the one tube $V_1$ were used, the potential at its anode would be equal to the supply voltage during plate current cut-off, and would drop when the gating pulse permitted plate current to flow. This would produce a negative output pulse during each gating pulse, which would mask the effect of the signal-derived fluctuation. To prevent this spurious signal, the screen of tube $V_2$ is connected to the anode of tube $V_1$, and the screen of tube $V_1$ is connected to the anode of tube $V_2$. Since the suppressor grids of the two tubes are tied together, the electron stream in each tube is partially diverted from the screen to the anode by the gating pulse. Furthermore, since the change in screen current is substantially equal and opposite to the change in the anode current, the total current through the resistor $R_6$ tends, during the gating pulse, to be increased by the anode current flow of tube $V_1$ and decreased by the drop in the screen current of tube $V_2$. Consequently, the potential at the anode of tube $V_1$ is substantially constant in the absence of signal applied to its first grid. A resistor $R_3$ serves to relatively adjust the cathode biases of tubes $V_1$ and $V_2$ to compensate for slight differences in the tubes. The output from the anode of tube $V_1$, which is determined by the signal from the discriminator occurring only during the duration of the gating pulse, is applied to the storage circuit.

A suitable storage circuit for use in the block 20 of Fig. 1 is shown in Fig. 3. The negative going pulses $31f$ (Fig. 6) from the gate 19 are applied to the grid of a cathode follower $V_3$. The output of tube $V_3$ passes through a capacitor $C_1$ and a diode $V_4$ to charge a capacitor $C_2$. The cathode follower $V_3$ is required to supply a sufficiently low source impedance to charge the capacitor $C_2$ during the short duration of a transmitted pulse. For longer pulses, this would not be required.

Capacitor $C_2$ discharges through a resistor $R_{12}$, and the time constant of the RC circuit consisting of resistor $R_{12}$ and capacitor $C_2$ is chosen to provide an amount of discharge between pulses slightly greater than the maximum decrease in the input signal at the grid of tube $V_3$ that is expected to occur as the result of transmitter frequency fluctuations. This insures that the value of the voltage across $V_4$ immediately after each pulse is determined by the amplitude of that pulse and not by preceding pulses. The time constant must be long enough to prevent sufficient discharge during the interval corresponding to maximum range of the system to introduce an objectionable amount of error. The value of the resistor $R_{12}$ is usually many megohms, and the RC circuit has too high an impedance to permit its connection to the comparator circuits following. Hence, a cathode follower $V_5$ is provided to give a low output impedance suitable for connection to the capacitor.

A suitable circuit for the gain adjuster 22 is shown in Fig. 4. This circuit consists of an amplifying tube $V_6$ and a cathode follower $V_7$. The tube $V_6$ acts as a voltage amplifier to provide the same gain in the signal channel as the gate and storage circuits do in the transmitter channel. The cathode follower $V_7$ is direct-coupled to the comparator circuit in the same way as tube $V_5$ of the storage circuit is. This arrangement provides a D. C. balance at the comparator input. This method of obtaining a balance is preferable to the use of an adjusting resistor or similar means, since the effect on the tubes of changes in the plate and heater voltages, tube aging, etc., will be similar in both circuits. Adjustment of the gain is obtained by means of the potentiometer $R_{15}$ in the input circuit of tube $V_6$.

A suitable circuit that may be employed for the amplitude comparator 21 is shown in Fig. 5. Signals from the storage circuit and the gain adjuster are applied to two identical pentode voltage-amplifying tubes $V_9$ and $V_{10}$, respectively. The anodes of these tubes are connected to the anodes of diodes $V_{11}$ and $V_{12}$, respectively. The cathodes of the diodes are connected to ground through a common load resistor $R_{27}$ across which the output is taken. The anode voltage of tube $V_9$ is determined by the amplitude of the signal from the storage circuit. This anode voltage causes a current flow through tube $V_{11}$ and resistor $R_{27}$ such that the diode $V_{12}$ is biased to cut off unless the potential at its anode is equal to or greater than the potential at its cathode. When the pulse potential applied to the first grid of tube $V_{10}$ causes the potential at its anode (and the anode of diode $V_{12}$) to equal or exceed the potential at the anodes of tubes $V_9$ and $V_{11}$, the diode $V_{12}$ conducts, and the excess signal appears as a pulse across the resistor $R_{27}$. A potentiometer $R_{28}$ connecting the cathodes of tubes $V_9$ and $V_{10}$ to ground can be adjusted to vary the threshold of conduction of diode $V_{12}$ over a small range. The wave forms in the graph J of Fig. 6 are made on the assumption that the adjustment is such as to permit a pulse equal in amplitude to the signal from the charging circuit to appear. Such an adjustment would permit echoes having 0 relative velocity to appear, but would exclude those receding at a velocity greater than some minimum value. This minimum value may be adjusted to either side of zero by properly positioning the movable contact on the potentiometer $R_{28}$.

A capacitor $C_3$ is used to neutralize the capacity of tube $V_{12}$. The pulse potential at the anode of tube $V_{12}$ will appear to some degree across the resistor $R_{27}$, due to capacity coupling, even though the diode $V_{12}$ is biased to cut off, unless something is done to prevent capacitive coupling. The signal at the grid of tube $V_{10}$ is opposite in phase (but of lesser amplitude) with respect to the signal at the anodes of tubes $V_{10}$ and $V_{12}$. Consequently, if the value of the capacitor $C_3$ is chosen to equal the value of the anode-cathode capacity of the diode $V_{12}$, multiplied by the gain of tube $V_{10}$, the potentials appearing across the resistor $R_{27}$ due to the two capacity paths will be equal and opposite and will cancel.

Although for the purpose of explaining the invention a particular embodiment thereof has been shown and described, obvious modifications will occur to a person skilled in the art, and I do not desire to be limited to the exact details shown and described.

I claim:

1. Apparatus for indicating frequency differences between two successively occurring pulses of A. C. comprising: frequency discriminating means for converting said successive pulses of A. C. to first and second D. C. pulses of amplitudes proportional to the respective frequencies of said A. C. pulses; means for deriving from said first D. C. pulse a D. C. potential continuing for the time interval between said first and second pulses; and amplitude comparator means for comparing said second pulse with said D. C. potential.

2. Apparatus according to claim 1 in which said frequency discriminating means has a single channel in which both said two A. C. pulses are successively converted to said D. C. pulses, and gating means for passing said first D. C. pulse to, and excluding said second D. C. pulse from, said potential deriving means.

3. Apparatus according to claim 2 in which said gating means is operative from a normal nonconducting condition into conducting condition by application thereto of a gating pulse; and gating pulse means for applying a gating pulse to said gating means coincident with said first pulse.

4. Apparatus according to claim 3 including means synchronized with said gating pulse means for generating the first of said two A. C. pulses.

5. Apparatus according to claim 1 in which said amplitude comparator means has a pulse input terminal, and means connecting it to the output of said frequency discriminating means, whereby both said first and second pulses are applied to said comparator means for comparison with said continuing D. C. potential.

6. Apparatus according to claim 5 in which said means connecting the output of said frequency discriminator to said pulse input terminal of said amplitude comparator include adjustable gain-varying means whereby the amplitudes of said first and second pulses can be similarly varied.

7. Apparatus according to claim 1 in which said means for deriving said continuing D. C. potential comprises a storage circuit charged by said first D. C. pulse to a potential proportional to that of said first pulse.

8. An echo object-detecting system comprising the apparatus of claim 1 in combination with means for generating and transmitting a pulse of high frequency energy and subsequently receiving a reflected pulse, said generated and reflected pulses constituting said two successively occurring pulses of A. C.

9. A system according to claim 8 in which said means for producing said first and second D. C. pulses includes: superheterodyning means including a local oscillator for converting said transmitted and received pulses of high frequency energy to pulses of intermediate frequency prior to production of said first and second D. C. pulses therefrom; and means responsive to changes in the amplitude of said separated first pulse for varying the frequency of said local oscillator in direction to compensate for frequency variations in said transmitted pulse of high frequency.

No references cited.